United States Patent [19]

Pross

[11] 4,037,972
[45] July 26, 1977

[54] MEASURING APPARATUS
[75] Inventor: Wilhelm Pross, Munich, Germany
[73] Assignee: Compur-Werk Gesellschaft mit beschrankter Haftung & Co., Munich, Germany
[21] Appl. No.: 619,915
[22] Filed: Oct. 6, 1975
[30] Foreign Application Priority Data
  Oct. 9, 1974   Germany .............................. 2448206
[51] Int. Cl.² .......................................... G01N 21/22
[52] U.S. Cl. .................................... 356/206; 250/565
[58] Field of Search ................. 356/206; 250/565, 575
[56] References Cited
U.S. PATENT DOCUMENTS
  3,576,558   4/1971   Devries ................................ 250/565

Primary Examiner—Vincent P. McGraw
Attorney, Agent, or Firm—Blanchard, Flynn, Thiel, Boutell & Tanis

[57] ABSTRACT

A zero-balancing arrangement incorporated into a pocket-type apparatus, which pocket-type apparatus is capable of being handled and operated by one hand of the user. The apparatus includes at least one battery to supply energy to a lamp which is used as a light source. A cuvet containing a liquid to be measured is placed into the path of a measuring light beam through an opening in the casing of the apparatus. A wedge-shaped filter is movable in the path of a second light beam by manual operation of a setting wheel. A measuring scale provided on the setting wheel can be inspected through a viewing window and the setting wheel can be adjustable relative to a mark fixedly located on the casing of the light beam paths provided in the apparatus, the first one travels through the liquid in the cuvet to a first photoelectric sensing device and the second light beam path travels unobstructed to a second photoelectric light sensing device. An electronic regulating system is provided to adjust the voltage at the inputs to a differential amplifier and to adjust the output of the differential amplifier to a zero value so that a light meter reading is initially adjusted to a zero value prior to a measuring of a particular liquid in the cuvet.

8 Claims, 4 Drawing Figures

U.S. Patent  July 26, 1977  Sheet 1 of 2  4,037,972
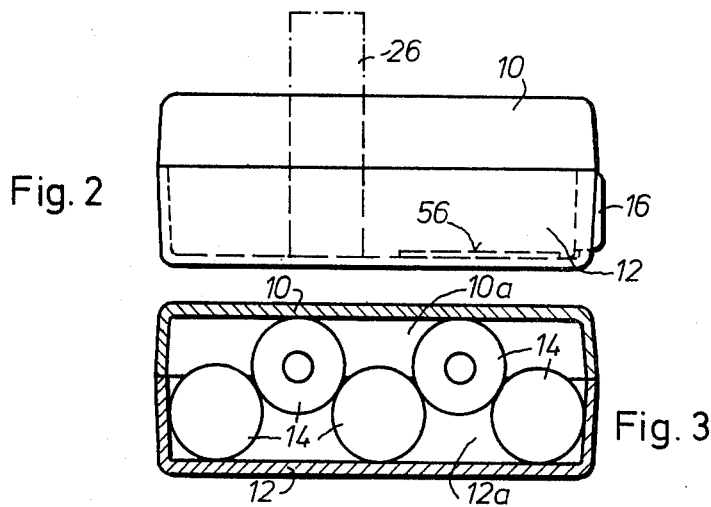
Fig. 2
Fig. 3
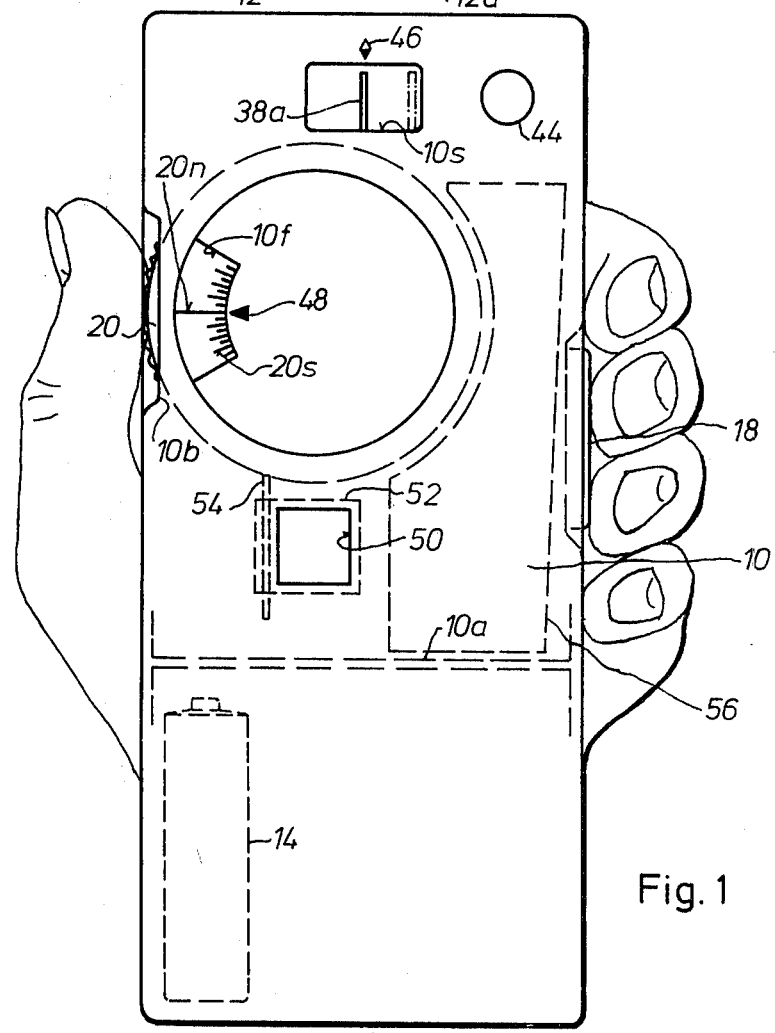
Fig. 1

MEASURING APPARATUS

FIELD OF THE INVENTION

This invention relates to an apparatus for measuring the light permeability of a measuring liquid for the purpose of testing a substance contained therein, in which a first photoelectric element is arranged in a measuring beam emitted by a light source and a second photoelectric element is disposed in the path of a comparison beam from the same light source. In apparatus of this kind, which are sometimes referred to as two-beam photometers, an adjustable balancing element (a diaphragm or filter) which is adapted to reduce the light intensity has heretofore usually been provided in the path of the comparison light beam to enable a zero-balancing or zero-levelling to be carried out before the final and critical measurement is made. This balancing is necessary to eliminate, before the measuring operation, all the zero errors which could occur caused by non-constant factors in the apparatus, such as brightness of the lamp, temperature susceptibility, voltage faults in the electronic elements, and so on.

BACKGROUND OF THE INVENTION

The use of mechanically adjustable balancing elements for this purpose is very restricted because their operation is troublesome and their disposition in apparatus of mini size is often not viable for reasons of space. Moreover, it is found impossible with such balancing elements to maintain the zero-balancing or zero-levelling over lengthy periods of time. It is an object of the present invention to provide a zero-balancing arrangement which avoids the drawbacks set out above. To this end, in the present invention, use is made of a differential amplifier with two inputs and a photoelectric element connected to each of the inputs, the output of the differential amplifier being connected to an indicator instrument, and an electronic regulating system connected to one of the inputs of the differential amplifier and adapted to come into operation on actuation of a switch to adjust the voltages set up at the two inputs of the differential amplifier to the same potential and the voltage at the output thereof leading to the indicator instrument to zero. In accordance with a further feature of the invention, the arrangement is advantageously such that the regulating system is connected to that input of the differential amplifier which is connected with the second photoelectric element located in the path of the comparison light beam.

In a preferred embodiment of the invention, the regulating system comprises a differential amplifier which is set up as an integrator, a condenser which feeds the integrated voltage, a Reed contact serving as a switch, and a feed circuit. The use of the feed circuit in the arrangement of the invention is very advantageous because the feed circuit maintains the zero-balance for a predetermined period of time after the Reed contact has been reopened.

The zero-balancing arrangement as devised in accordance with the present invention is used with particular advantage in apparatus of pocket form in which the constructional parts are incorporated in a flat casing which can be held in the hand and which includes at least one battery for a lamp used as the light source. In accordance with a further feature of the invention, the casing of the apparatus has an opening for introduction of a cuvet containing the measuring liquid into the path of the measuring beam, and a wedge filter is movable in the path by a manual operable setting wheel, the knurled periphery of which projects partially at the narrow side of the casing of the apparatus. Here a measuring scale is provided on the setting wheel and can be inspected through a viewing window at the flat side of the casing of the apparatus and is adjustable relative to a mark which is fixed in relation to the apparatus.

BRIEF DESCRIPTION OF THE DRAWINGS

An embodiment of the zero-balancing or zero-levelling apparatus according to the invention will now be described with reference to the accompanying drawings, in which:

FIGS. 1 and 2 are, respectively, a plan view and an end view of the apparatus;

FIG. 3 is a view, partly in section, of a detail; and

DETAILED DESCRIPTION

Figure 4:
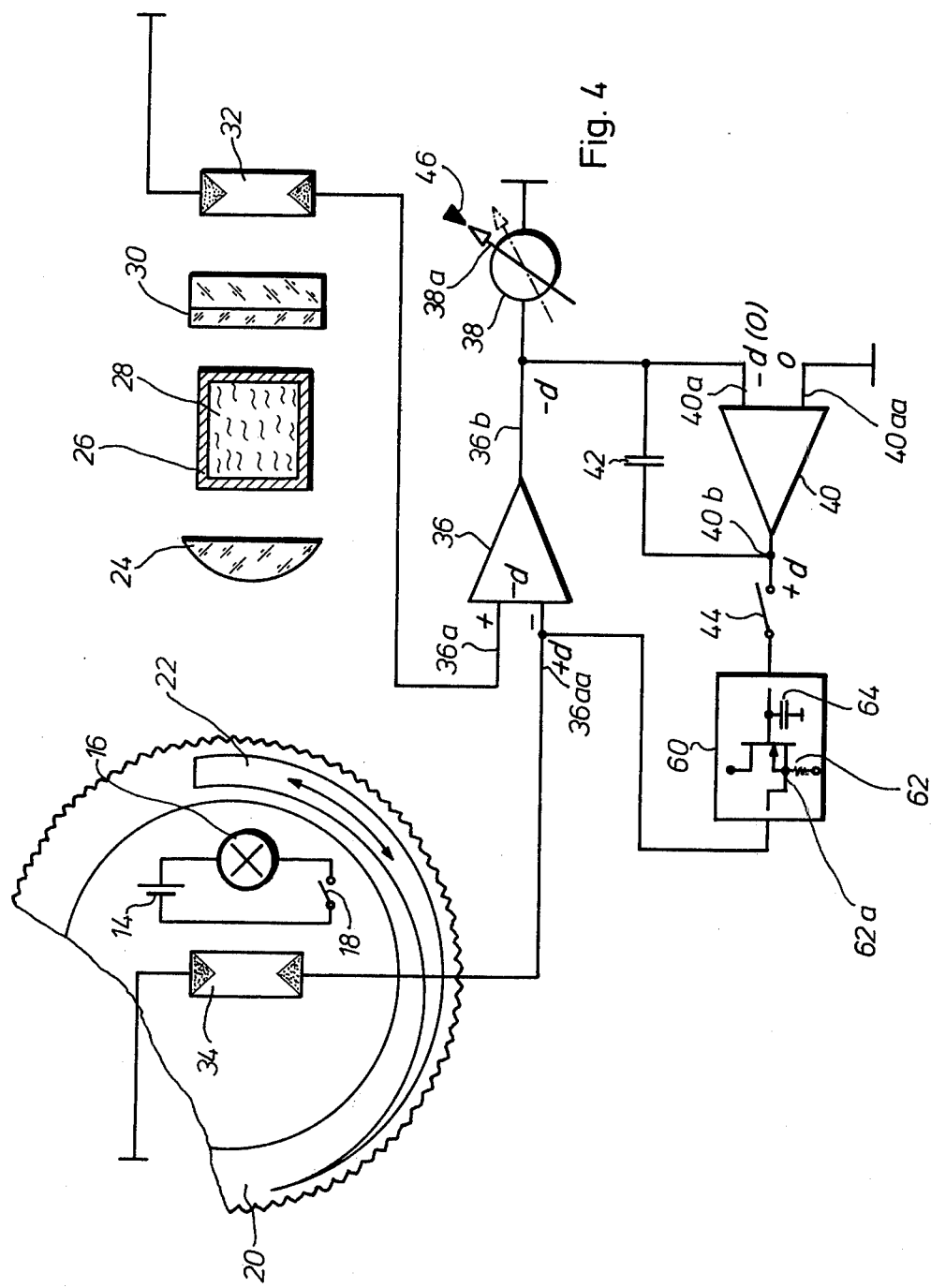
FIG. 4 is a diagrammatic illustration of the measuring arrangement incorporating a block diagram of the electrical equipment.

The measuring apparatus is installed in a casing consisting of two flat elongated casing halves 10, 12 connected by fastening screws (not shown). Both of these halves are of a thin-walled construction and made preferably of a plastics material, thereby providing a light transportable casing.

Walls 10a, 12a, transverse to the longitudinal direction of the casing, provide in the interior of the latter a compartment for a number of batteries 14 and their contacts which serve as a current source for a lamp 16, the beam from which is to illuminate the measuring liquid. A switch 18 is disposed at one longitudinal side of the casing 12 to provide a connection of the lamp 16 to the circuit of the battery.

The remaining compartment in the casing 10, 12 accommodates the other constructional elements of the measuring arrangement. A setting wheel 20 surrounds the lamp 16 and carries an arcuate wedge filter 22. During the measuring operation, the light beam from the lamp 16 is passed via a lens 24 through a cuvet 26 containing the measuring liquid 28 (a reactive liquid containing a substance which is mixed therewith in a predetermined ratio). This beam passes through a color filter 30 to impinge on a photoelectric element 32 and thereby produce an electrical current at a voltage proportional to the light intensity. A second photoelectric element 34 is directly illuminated by the beam from the lamp 16 also to generate an electrical current.

The associated measuring circuitry of FIG. 4 includes a differential amplifier 36, the two inputs 36a, 36aa of which are connected to the photoelectric elements 32 and 34, respectively. An indicator instrument 38 having a pointer 38a is connected to the output 36b of amplifier 36.

To eliminate disruptive factors which might possibly arise during the measuring process (fluctuating battery voltage, temperature effects, etc.), use is made of a control arrangement including a regulating circuit 40 and a feed circuit 60 for zero-levelling, these being associated with the differential amplifier 36 in the manner illustrated in FIG. 4. When a switch 44 is closed — with the lamp 16 switched on but before the cuvet 26, 28 is introduced — the voltage generated by the photoelectric elements 32, 34 is balanced out at the two input terminals 36a, 36aa of the differential amplifier 36 by the regulating circuit, that is to say these voltages are brought to the same value, and through the feed circuit provision is made for the resultant balancing or levelling to be maintained for a predetermined lapse of time of a few minutes sufficient for the performance of the measurement. After the balancing or levelling operation has taken place, the pointer 38a of the indicator instrument 38 lies opposite a zero index 46 fixed relative to the casing.

The regulating circuit includes a differential amplifier 40 which is connected to function as an integrator and a condenser 42 which receives the integrated voltage. One input 40a of the amplifier 40 is connected to the output 36b of the amplifier 36 while the other input 40aa is connected to ground. The output 40b of the amplifier 40 is connected to a high-ohm Reed contact serving as the switch 44. The feed circuit 60 includes a field effect transistor 62 (FET) and a condenser 64 which is connected to the gate of the FET 62. The source-connection 62a from the FET 62 is connected to the input 36aa of the differential amplifier 36.

The supply and operating voltage for the differential amplifier 36 and the other electronic elements of the system is taken from the battery 14. The conductors for this purpose have not been shown in the drawing so as not to burden the illustration. These conductors are, however, arranged so that they are closed when the switch 18 is operated, thereby to place the circuitry under operating voltage.

It can be seen from FIG. 1 that the peripheral knurling of the setting wheel 20 partially projects from the narrow side of casing 10, 12 in a recess or notch 10b in the latter, thereby enabling it to be operated by a finger of the hand which is holding the casing. Directly beside this actuating area at the flat side of the casing 10 is a viewing window 10f through which a scale 20s on the upper face of the setting wheel 20 can be observed. This scale 20s cooperates with a marking 48 stationarily positioned on the casing. The pointer 38a of the indicator instrument 38 moves in a further viewing window 10s in the flat side of the casing 10 which also has a marking 46 associated therewith. The switch 44 takes the form of a press button located at the righthand side and adjacent the viewing window 10s.

Provided along the flat side of the casing 10 is a square opening 50 which enables the cuvet 26 (also square) to be introduced into the interior of the casing and into the path of the measuring light beam. A cover flap 52 is pivotally mounted on a bearing pin 54 inside the casing 10 and is biased by a spring (not shown) so that it closes the opening 50 to prevent the emergence of light. When the cuvet 26 is introduced, the flap 52 is swung back by the cuvet against the interior of the casing.

The elements of the measuring and control arrangement, and the associated electrical conductors are mounted (at least to a partial degree) on a carrier plate 56 secured inside casing 12. The details of this arrangement are here of no importance so that they will not be further referred to.

OPERATION

The measuring apparatus described operates as follows:

The user holds the apparatus in his left hand and with his thumb moves the setting wheel 20 at the peripheral part thereof until the zero marking 20n of the scale 20s lies opposite the mark 48. The darkest zone of the wedge filter 22 assumes a datum position in the path of the measuring light beam between the lamp 16 and the photoelectric element 32. It will be understood by those having ordinary skill in this art that the wedge filter will not block out all of the light but will leave a small amount of light in the measuring light beam. The flap 52 is closed and no cuvet 26 is placed in the opening 50. The switch 18 is now operated by a finger of the same hand to ignite the lamp 16 and thereby illuminate, through the elements 24, 30, the photoelectric element 32 by the measuring light beam and also, directly, the photoelectric element 34 by the comparison light beam. If the pointer 38a moves away from the zero position in relation to the mark 46, different voltages are applied at the inputs 36a and 36aa of the differential amplifier 36 so that a zero-levelling is now required before the measuring process. For this purpose the Reed contact 44 is closed, whereafter a voltage is integrated on the condensor 42 of the differential amplifier 40 as long as an equal voltage prevails at the two inputs 40a, 40aa of the amplifier 40 - in the present instance zero voltage. The integrated voltage at the output 40b of the differential amplifier 40 is fed into the feed circuit 60 through its condenser 64. A voltage is made available at a voltage distributor of the source connection 62a of the FET 62 and is fed to the input 36aa of the differential amplifier 36. This, by means of the regulator arrangement, immediately sets up a voltage at this input 36aa which produces an equal voltage potential at the two inputs 36a and 36aa of the differential amplifier 36 and thereby a zero voltage at its output 36b. The zero-levelling has now been carried out and the pointer 38 moves back to the mark 46. The voltage which is present at the condenser 64 during this voltage levelling remains for a longer period after the reopening of the Reed contact 44 so that the feed circuit 60 can maintain this balanced zero condition for a sufficient time.

The cuvet 26 with the measuring liquid 28 is now, and only now, introduced into the opening 50 and into the path of the measuring light beam. The light incident on the photoelectric element 32 is correspondingly restricted by the measuring liquid. The pointer 38a of the indicator instrument 38 makes a corresponding swing, for example into the position depicted by a broken line in FIGS. 1 and 4. The setting wheel 20 is then moved by the thumb until the wedge filter 22, moving therewith, allows the light beam to brighten up a corresponding amount. The pointer 38 moves back from the dotted position to the zero position opposite mark 46. When this zero position is reached, the setting wheel 20 and its wedge filter 22 are adjusted to a predetermined angular extent which can be read off scale 20s. The scale 20s will be calibrated in accordance with the prevailing kind of measurement required so that the result can be read directly after the measuring operation, for example the proportion of haemoglobin in the blood given in percentages.

The principle of this invention can also be used in two-beam photometers of different constructions from that shown in the specific embodiment described above, for example can be applied to stationary bench apparatus.

The embodiments of the invention in which an exclusive property or privilege is claimed are defined as follows:

1. An apparatus for measuring the light permeability of a measuring liquid for the purpose of testing a substance contained therein, comprising a first photoelectric element arranged in a measuring beam emitted by a light source and a second photoelectric element disposed in the path of a comparison beam from the same light source, a differential amplifier having two input terminals with said first photoelectric element being connected to one of said input terminals and said second photoelectric element being connected to the other of said input terminals, an indicator instrument connected to an output terminal of said differential amplifier, and a switch operated electronic regulating system connected to one of said input terminals of said differential amplifier and coming into operation on actuation of said switch for adjusting (1) the voltages set up at the two input terminals of said differential amplifier to the same potential and (2) the voltage applied to said output terminal connected to said indicator instrument to zero.

2. Apparatus according to claim 1, wherein said regulating system is connected to that input terminal of said differential amplifier which is connected with said second photoelectric element located in the path of said comparison light beam.

3. Apparatus according to claim 1, wherein said regulating system comprises a differential amplifier which is set up as an integrator, a condenser which feeds the integrated voltage, a Reed contact serving as a switch, and a feed circuit.

4. Apparatus according to claim 3, wherein the feed circuit maintains the zero-balance for a predetermined period of time after the Reed contact has been re-opened.

5. Apparatus according to claim 3, wherein the feed circuit includes a condenser and an FET (field effect transistor).

6. Apparatus according to claim 1, wherein the constructional parts are incorporated in a flat elongated casing which can be held in the hand and comprises at least one battery for a lamp which serves as a light source.

7. Apparatus according to claim 6, wherein the casing of the apparatus has an opening for introduction of a cuvet containing the measuring liquid into the path of the measuring beam, and a wedge filter is movable in the path by a manual operable setting wheel, the knurled periphery of which projects partially at the narrow side of the casing of the apparatus.

8. Apparatus according to claim 7, wherein a measuring scale is provided on the setting wheel and can be inspected through a viewing window at the flat side of the casing of the apparatus and is adjustable relative to a mark which is fixed in relation to the apparatus.

* * * * *